United States Patent
Shibata et al.

[11] Patent Number: 5,980,379
[45] Date of Patent: Nov. 9, 1999

[54] DEFROSTER NOZZLE

[75] Inventors: Minoru Shibata; Fumitake Kobayashi; Takahiro Komori, all of Inazawa; Masahiko Yanagihara, Toyota; Hidekazu Otowa, Toyota; Makoto Mimoto, Toyota, all of Japan

[73] Assignees: Toyoda Gosei Co., Ltd.; Toyota Jidosha Kabushiki Kaisha, both of Aichi, Japan

[21] Appl. No.: 09/031,046

[22] Filed: Feb. 26, 1998

[30] Foreign Application Priority Data

Feb. 27, 1997 [JP] Japan .................................. 9-043971

[51] Int. Cl.$^6$ ...................................................... B60S 1/54
[52] U.S. Cl. .............................................................. 454/127
[58] Field of Search ............................... 454/85, 93, 127, 454/198

[56] References Cited

U.S. PATENT DOCUMENTS

| 2,096,901 | 10/1937 | Knecht | 454/127 |
| 2,606,074 | 8/1952 | Ackerman | 454/198 X |
| 5,113,748 | 5/1992 | Shibuya | 454/127 |
| 5,277,657 | 1/1994 | Truitt | 454/198 |

FOREIGN PATENT DOCUMENTS

| 46-24424 | 8/1971 | Japan . | |
| 62-163457 | 10/1987 | Japan . | |
| 63-242712 | 10/1988 | Japan | 454/127 |
| 64-1111 | 1/1989 | Japan . | |
| 1-170011 | 11/1989 | Japan . | |
| 4-129821 | 4/1992 | Japan . | |
| 7-12109 | 3/1995 | Japan . | |

*Primary Examiner*—Harold Joyce
*Attorney, Agent, or Firm*—Pillsbury Madison & Sutro LLP

[57] ABSTRACT

A defroster nozzle is provided inside an instrument panel below a front glass plate, and its length in the direction of vehicle width is gradually increased from a suck-in opening to a blow-out opening. The suck-in opening is connected to an air conditioning unit, and has a bent portion at the middle thereof. The inside of the defroster nozzle is divided by partition walls into a central chamber and side chambers. The length of the central chamber as viewed in the direction of vehicle width is gradually increased from the suck-in opening to the blow-out opening, and the opening areas of the suck-in opening and the blow-out opening of the central chamber are equal to each other. The central portion of the side wall of each of the side chambers has a bent portion. The length of each of the side chambers as viewed in the direction of vehicle width is increased gradually from the bent portion to the blow-out opening, and at each of the bent portion the cross-sectional area of the side chamber is smaller than the opening area on the side of the suck-in opening. At each of the side chambers, the opening area on the side of the blow-out opening is smaller than the opening area on the side of the suck-in opening.

18 Claims, 5 Drawing Sheets

DEFROSTER NOZZLE

BACKGROUND OF THE INVENTION

1. Field of the Invention

This invention relates to a defroster nozzle used for a defroster in an automobile.

2. Description of the Related Art

In general, in order to make the front glass plate (or windshield) of an automobile clear, a defroster is employed. In general, the defroster comprises a defroster nozzle, and an air control unit. The defroster nozzle is provided inside the instrument panel of the vehicle chamber, and has a blow-out opening and a suck-in opening. The blow-out opening is opened in the surface of the instrument panel, and the suck-in opening is connected to the air control unit. The air introduced from the air control unit through the suck-in opening is applied to the inner surface of the front glass plate, to dry the front glass plate to make the front glass plate clear.

A defroster of this type should meets the following conditions (performances):

(1) In order to obtain a minimum visibility quickly which is required for safety driving, the performance of quickly make the front glass plate clear uniformly and quickly (so-called "clearing performance") should be improved.

(2) The defroster should be miniaturized, and be decreased in manufacturing cost. In addition, the space required for installation of the defroster should be decreased, so that the degree of freedom with respect to the design of the interior of the instrument panel should be increased.

(3) The ventilation resistance in the defroster nozzle should be decreased, so that the energy loss should be reduced, thereby to minimize the power consumption.

(4) The noise attributing to the ventilation through the defroster nozzle (so-called "ventilation nozzle") should be minimized.

SUMMARY OF THE INVENTION

An object of the invention is to provide a defroster which meets the above-described conditions (performance). More specifically, an object of the invention is to provide a defroster which is improved in clearing performance, decreased in size, and reduced in ventilation resistance and in ventilation noise.

The foregoing object of the invention has been achieved by the provision of the following defroster nozzle provided inside an instrument panel of an automobile and blowing an air supplied from an air conditioning unit to a front glass plate of the automobile, comprising: a suck-in opening formed at a lower end portion of the defroster nozzle so as to introduce the air from the air conditioning unit; a blow-out opening formed at an upper end portion of the defroster nozzle so as to blow the air from the suck-in opening to the front glass plate of the automobile; and a plurality of partition boards which divide an inside of the defroster nozzle into a plurality of chambers arranged in a width direction of the automobile, wherein the chambers are so constituted that flow-rates of the air flowing a plurality of chambers increase towards both end chambers from a central chamber.

Further, the foregoing object of the invention has also been achieved by the provision of the following defroster nozzle provided inside an instrument panel of an automobile and blowing an air supplied from an air conditioning unit to a front glass plate of the automobile, comprising: a suck-in opening formed at a lower end portion of the defroster nozzle so as to introduce the air from the air conditioning unit; a blow-out opening formed at an upper end portion of the defroster nozzle so as to blow the air from the suck-in opening to the front glass plate of the automobile; and a plurality of partition boards which divide an inside of the defroster nozzle into a plurality of chambers arranged in a width direction of the automobile, wherein the chambers are so constituted that ratios of an opening area on a side of the blow-out opening to an opening area on a side of the suck-in opening decrease towards both end chambers from a central chamber.

DETAILED DESCRIPTION OF THE PREFERRED EMBODIMENTS

One preferred embodiment of the invention will be described with reference to the accompanying drawings.

Figure 1:
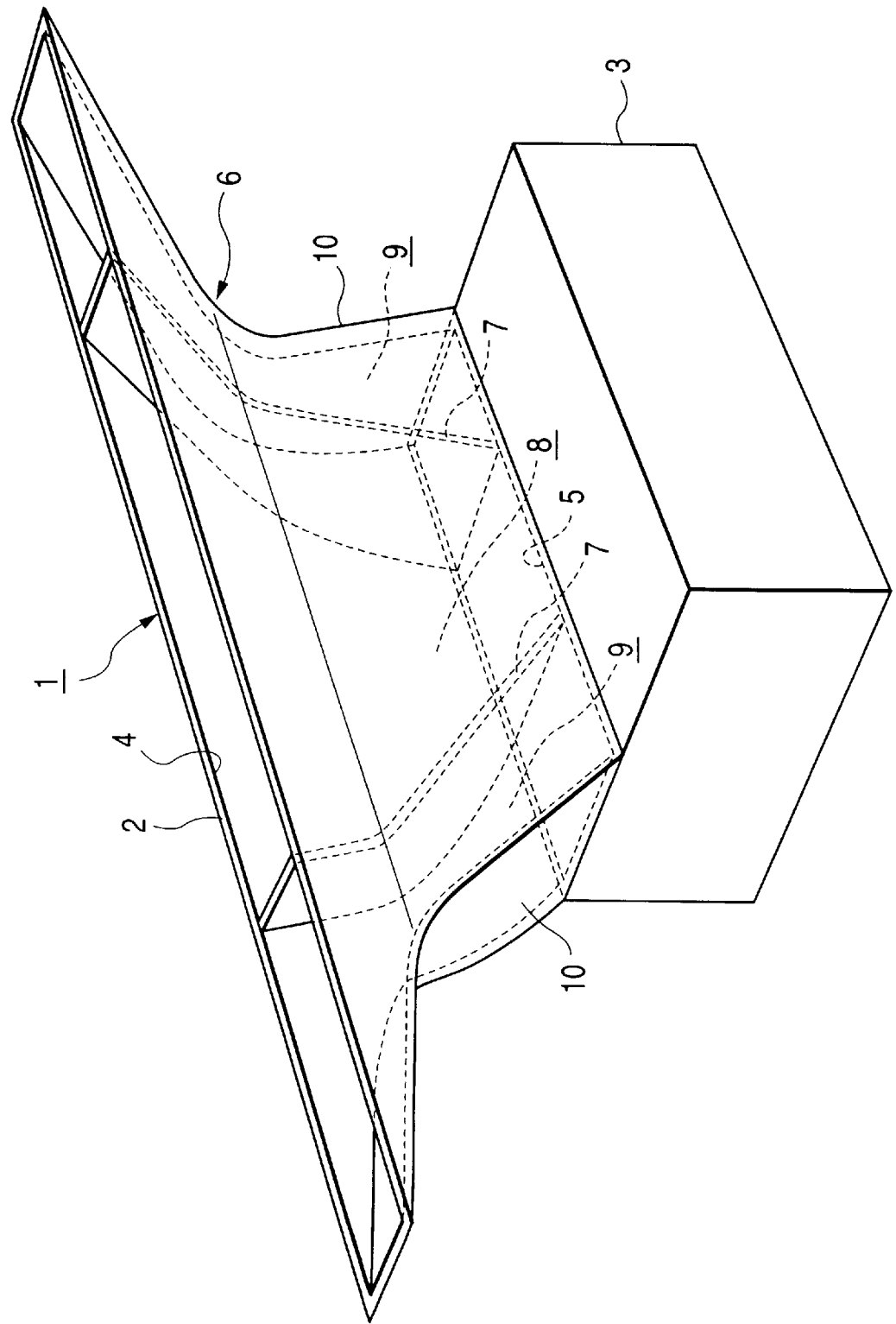
FIG. 1 is a perspective view of a defroster to which a defroster nozzle according to an embodiment of the invention is applied.
Figure 2:
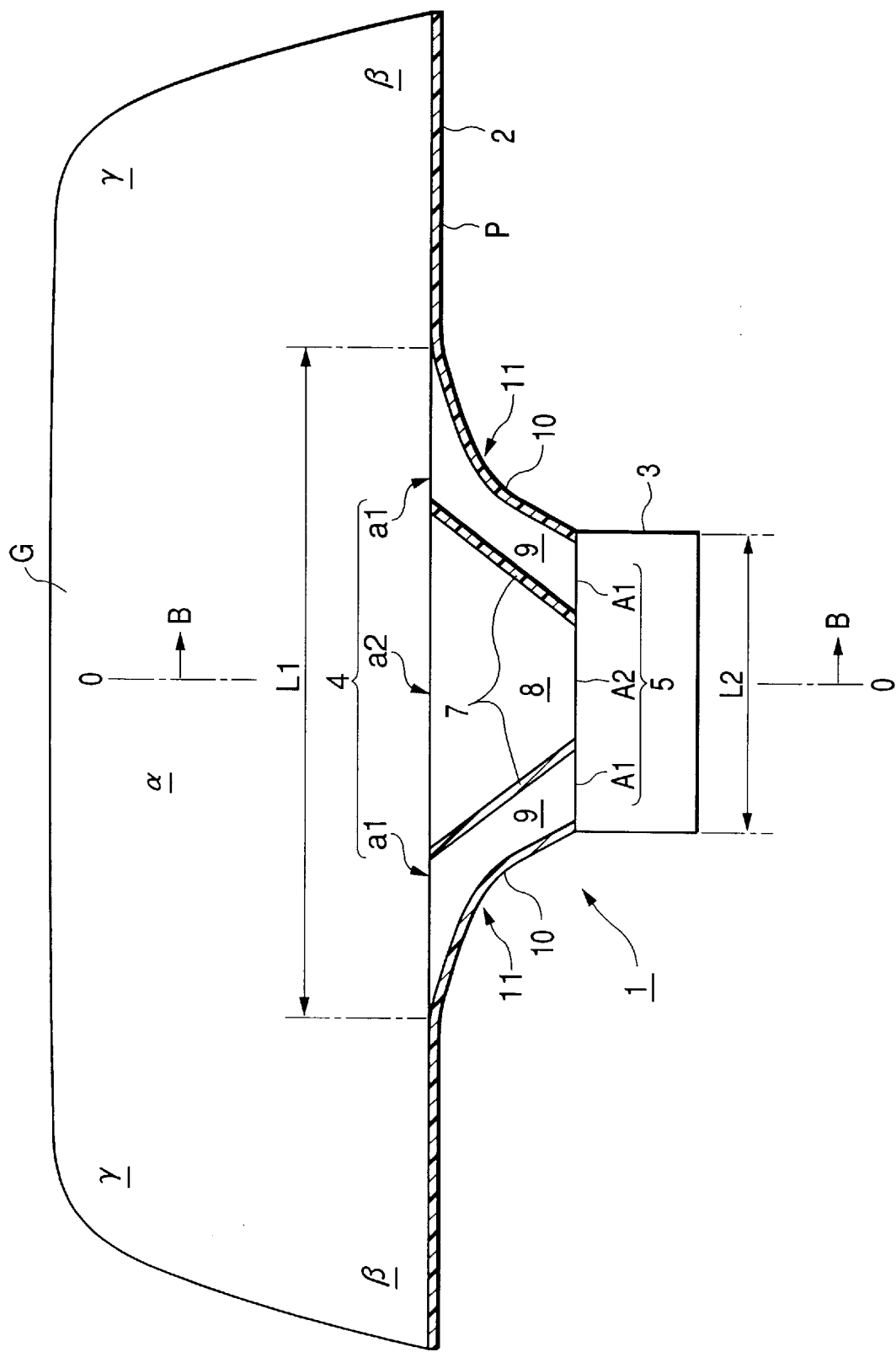
FIG. 2 is a sectional view taken along line A—A in FIG. 3, showing essential components of the defroster which is mounted on an automobile.
Figure 3:
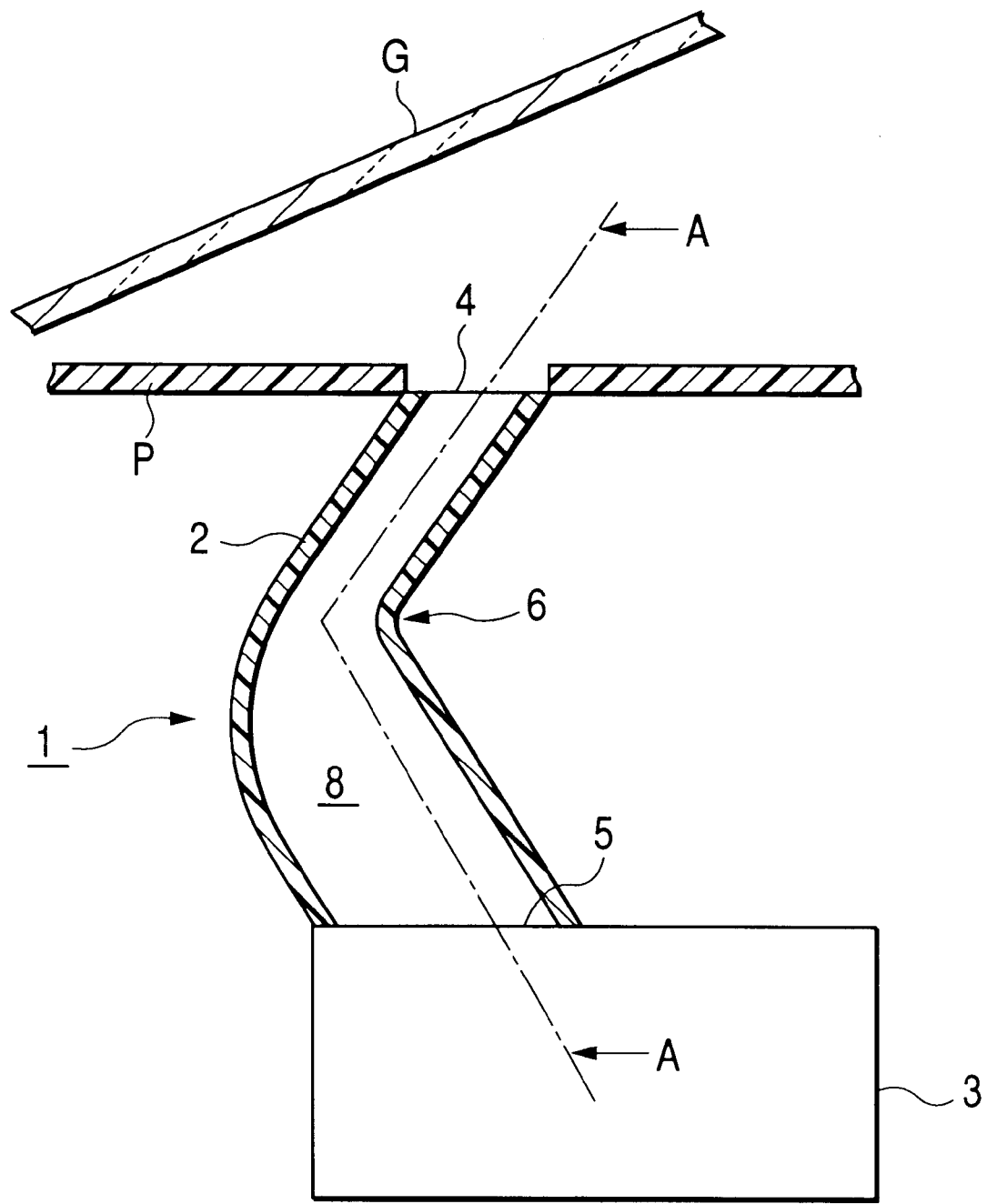
FIG. 3 is a sectional view taken along line B—B in FIG. 2.
Figure 4:
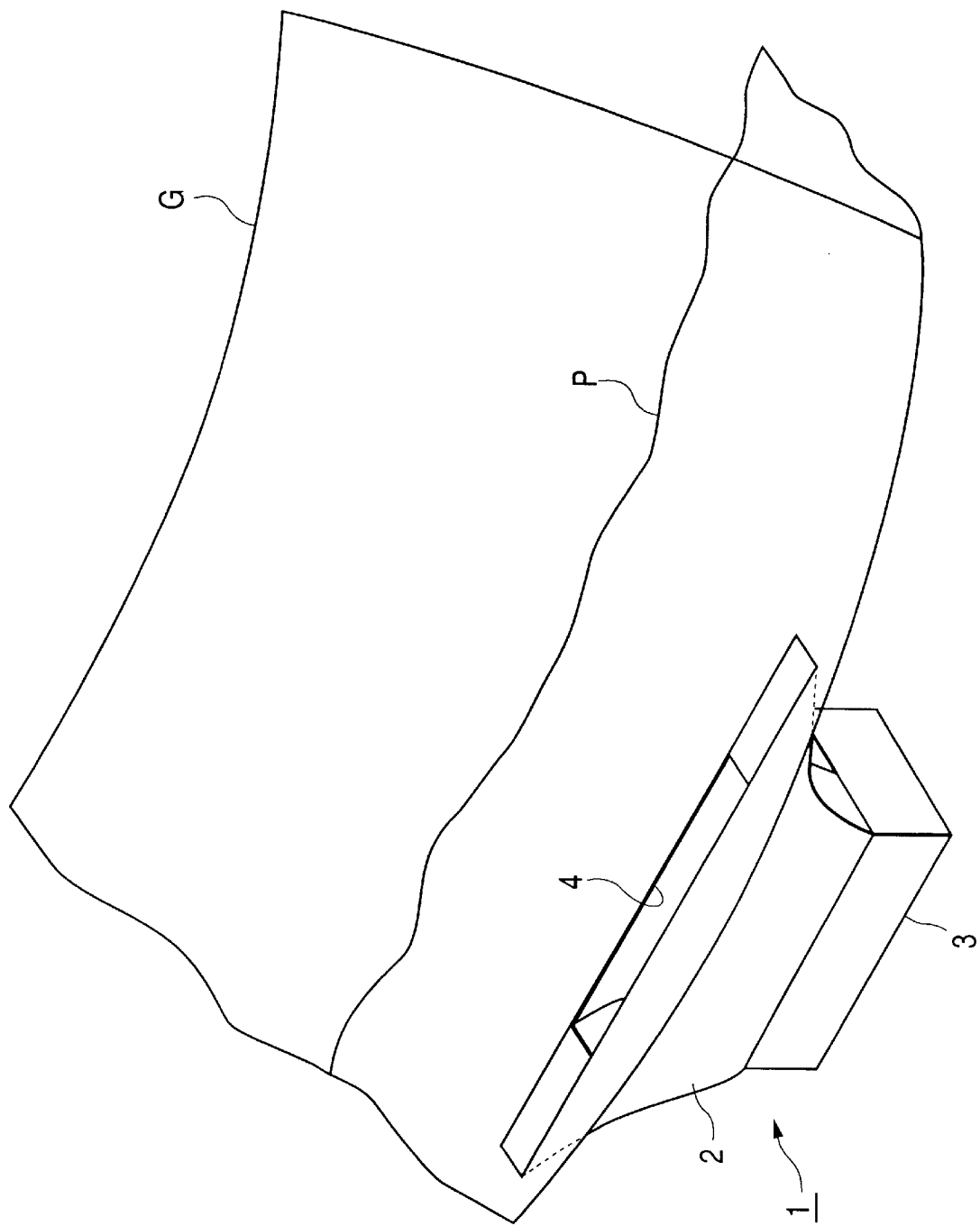
FIG. 4 is a perspective view showing essential components of the defroster which is mounted on an automobile.

FIG. 1 is a perspective view of a defroster 1. FIG. 2 is a sectional view taken along line A—A in FIG. 3, showing essential components of the defroster which is mounted on an automobile. FIG. 3 is a sectional view taken along line B—B in FIG. 2. FIG. 4 is a perspective view showing essential components of the defroster which is mounted on an automobile.

The defroster 1 comprises a defroster nozzle 2, and an air conditioning unit 3.

The defroster nozzle 2 is provided inside an instrument panel P which is located below a front glass plate G in the vehicle chamber of an automobile. The defroster nozzle 2 is in the form of a cylinder having upper and lower open ends, and it is formed long in the direction of vehicle width. The upper end opening is a rectangular blow-out opening 4, while the lower end opening is a rectangular suck-in opening 5. The defroster nozzle 2 is substantially in the form of a sector which becomes longer (wider) in the direction of vehicle width towards the blow-out opening 4 from the suck-in opening 5. The length L1 of the blow-out opening 4 in the direction of vehicle width is substantially twice as long as the length L2 of the suck-in opening 5 in the direction of vehicle width. The blow-out opening 4 is opened in the surface of the instrument panel P, while the suck-in opening 5 is connected to an air conditioning unit 3 provided in the instrument panel P.

The defroster nozzle 2 has a bent portion 6 substantially at the middle as viewed in the direction of height. The bent portion 6 is bent (curved) in the front-to-rear direction of the vehicle. Hence, the direction of flow of the air introduced in the oblique-forward direction of the vehicle from the air conditioning unit 3 through the suck-in opening 5 is changed to oblique-backward direction by the bent portion 6, and then the air thus changed in the direction of flow is discharged through the blow-out opening 4.

The inside of the defroster nozzle 2 is divided by two partition walls 7 into three chambers which are arranged in the direction of vehicle width. The three chambers are a central chamber 8, and two right and left side chambers 9 and 9 provided on both sides of the central chamber 8.

The partition walls 7 are each linear in section, and arranged symmetrical with respect to the central line O (as viewed in the direction of vehicle width) forming an acute angle with the latter O. Hence, the central chamber 8 is expanded substantially in the form of a sector from the suck-in opening 5 to the blow-out opening 4. However, it should be noted that the length of the central chamber (as viewed in the direction of vehicle length) becomes shorter towards the blow-out opening 4 from the suck-in opening 5. Further, in the central chamber 8, the opening area a2 on the side of the blow-out opening 4 is equal to the opening area A2 on the side of the suck-in opening 5. That is, the ratio (throttle ratio) of the opening area a2 to the opening area A2 is as follows (Equation (1)):

$$a2/A2=1 \tag{1}$$

In the side chambers 9 and 9, the outer walls 10 of the defroster nozzle which confront with the respective partition walls 7 (hereinafter referred to as "side walls 10", when applicable) have bent portions 11 which are bent in the direction of vehicle width substantially at the middle as viewed in the direction of the height thereof. Each of the side chambers 9 is larger in length as viewed in the direction of vehicle width towards the blow-out opening 4 from the bent portion 11 in such a manner that it is substantially in the form of a sector. Hereupon, at the bent portion, the sectional area of each of the side walls 9 is smaller than the opening area A1 on the side of the suck-in opening 5. In addition, at each of the side walls 9, the opening area a1 on the blow-out opening (4) side is smaller than the opening area A1 on the suck-in opening 5. That is, the ratio (throttle ratio) of the opening area a1 to the opening area A1 is as follows:

$$a1/A1<1 \tag{2}$$

The defroster nozzle is made of synthetic resin, and is formed as one unit including the partition walls 7.

The defroster 1 thus constructed operates as follows.

(1) The air introduced into the suck-in opening 5 from the air conditioning unit 3 is discharged through the blow-out opening 4 being deflecting at the bend portion 6. The air thus discharged collides with the inner surface of the front glass plate G upwardly (from the lower portion to the upper portion), thus drying the inner surface of the front glass plate G, that is, making the front glass plate G clear.

(2) The central chamber 8 of the defroster nozzle 2 is substantially in the form of a sector being larger in the direction of vehicle width toward the blow-out opening 4 from the suck-in opening 5. Therefore, in the central chamber 8, the air introduced from the suck-in opening 5 is caused to flow the inner side surfaces of the partition walls 7, thus being discharged therefrom as a rectangular air stream.

As indicated in Equation (1), the ratio (throttle ratio) of the opening area a2 to the opening area A2 is "1". The following things may be said about the throttle ratio (a2/A2=1), the ventilation resistance and the ventilation noise of the defroster nozzle 2, the spread of air discharged through the blow-out opening 4, and the flow rate of air discharged from the blow-out opening 4:

(a) As the throttle ratio becomes larger than "1", the air discharged from the blow-out opening 4 becomes hard to spread.

(b) As the throttle ratio becomes smaller than "1", the ventilation resistance, the ventilation noise, and the flow rate of air discharged from the blow-out opening are increased.

Hence, in the central chamber 8 where the throttle ratio is set to "1", the air discharged from the blow-out opening 4 spreads widely in the direction of vehicle width, thus uniformly making clear the wide region of the central portion (α in FIG. 2) of the front glass plate G. In addition, in the central chamber 8, the ventilation resistance can be reduced. And with the energy loss decreased, the air conditioning unit 3 is reduced in power consumption. Furthermore, in the central chamber 8, the ventilation noise is decreased.

(3) In each of the side chambers 9 of the defroster nozzle 2, the side wall 10 has the bent portion 11. And each side chamber 9 is so formed that the length in the direction of vehicle width is larger towards the blow-out opening 4 from the bent portion 11, thus being sector in section. Hence, in each side chamber 9, the air introduced from the suck-in opening 5 is caused to flow along the bent portion of the side wall 10, and discharged from the blow-out opening 4 as a rectangular air stream.

(4) At the bent portion 11, the cross sectional area of each of the side chambers 9 is smaller than the opening area of the suck-in opening 5. Therefore, in each side chamber 9, the air introduced from the suck-in opening 5 is throttled at the bent portion 11, thus being increased in flow rate. Thus, the air is discharged through the blow-out outlet at the flow rate.

(5) As indicated in Equation (2), in each of the side chambers 9, the ratio (throttle ratio) of the opening area a1 to the opening area A1 is smaller than "1". Therefore, in each side chamber 9, the ventilation resistance and the ventilation noise are increased, and the flow rate of the air discharged through the blow-out opening 4 is also increased.

(6) Because of the synergism of the above-described paragraphs (4) and (5), in each of the side chambers 9 the flow rate of the air discharged through the blow-out opening 4 is considerably high. Hence, as is seen from paragraph (3), in each side chamber 9, the air discharged, in the form of a wide rectangular stream, from the blow-out opening 4 is caused to positively collide with the front glass plate G from both end portions (β in FIG. 2) towards the upper end portion (γ in FIG. 2). Therefore, even if, in each of the side walls 9, the length of the blow-out opening 4 in the direction of vehicle width is decreased, the end portions of the front glass plate G can be uniformly made clear.

In other words, in order to cause the air discharged through the blow-out opening 4 to collide with the front glass plate G to the ends thereof, the cross sectional area of each side chamber 9 at the bent portion 11, and the ratio (throttle ratio) of the opening area a1 to the opening area A1 of each side chamber 9 are determined.

(7) Because of the synergism of the above-described paragraphs (2) and (6), the whole surface of the front glass plate G can be uniformly and quickly made clear; that is, the defroster is improved in clearing performance.

(8) As is seen from the above-described paragraph (6), in each of the side chambers 9, the length of the air-blow opening in the direction of vehicle width can be decreased, and therefore the whole length L1 of the blow-out opening 4 of the defroster nozzle including the central chamber (as viewed in the direction of vehicle width) can be decreased. Accordingly, the defroster nozzle 2 can be miniaturized, and can be decreased in manufacturing cost. In addition, the space occupied by the defroster nozzle 2 is decreased, and the design of the interior of the instrument panel is increased in the degree of freedom.

(9) As aforementioned above, it should be note that the fundamental condition to achieve the object of the present invention is to increase the flow-rates of the air flowing a plurality of chambers towards both end chambers.

The above-described embodiment may be modified as follows. Those modifications have the same functions and effects as the above-described modification.

(a) The number of partition walls 7 is increased to more than two, and the inside of the defroster nozzle 2 is divided into more than three chambers. In this case, as a chamber is shifted from the central chamber to both end chambers, its throttle ratio (the opening area on the blow-out opening 4 to the opening area on the suck-in opening 5) is decreased (that is, the chambers thus formed are smaller in the throttle ratio towards both ends of the defroster nozzle), and the cross-section area at the bent section 11 is made smaller than the opening area of the suck-in opening 5.

Figure 5:
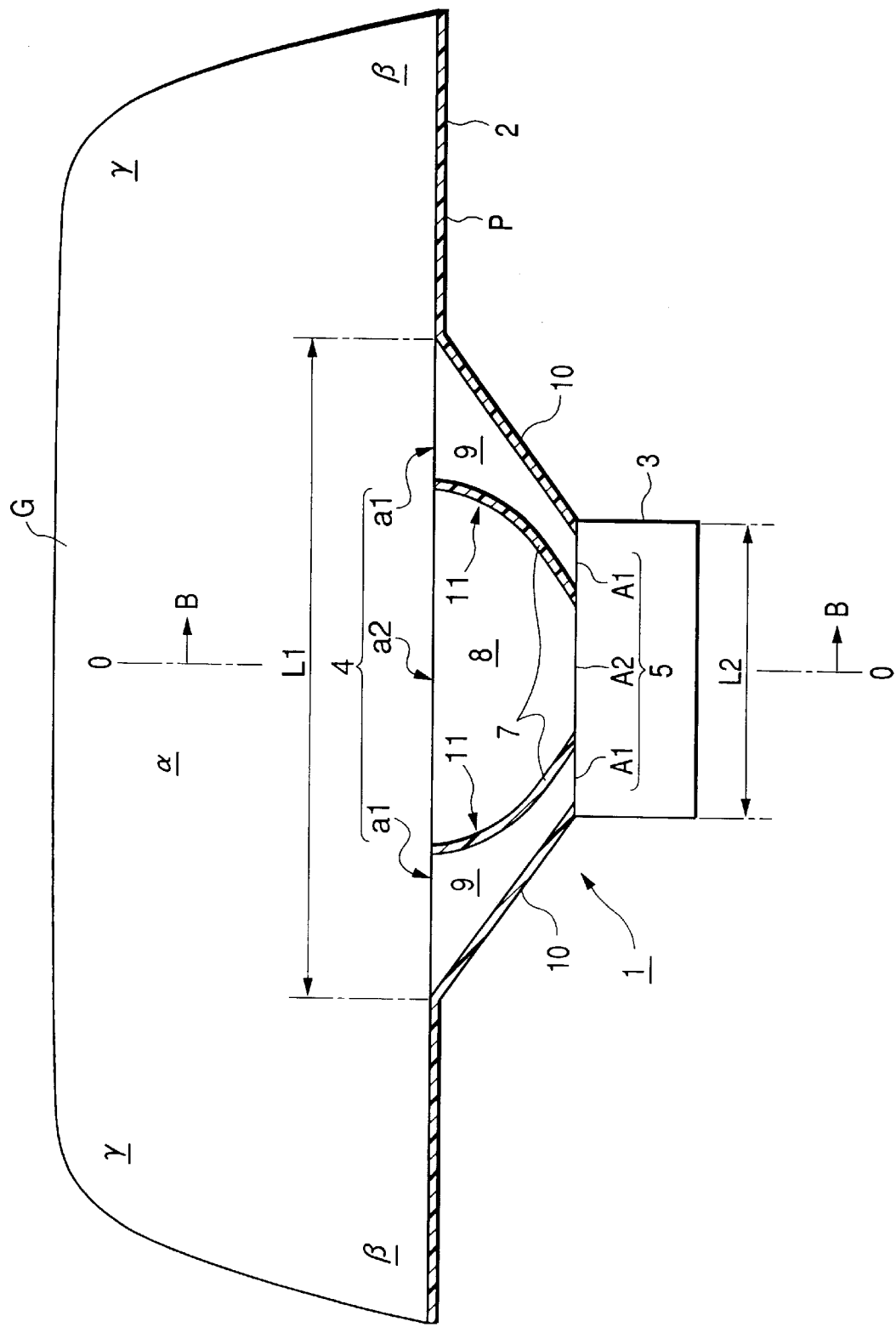
FIG. 5 is a sectional of a defroster using another embodiment of the defroster nozzle according to the present invention.

(b) The side walls 10 are made straight in section, while the partition walls 7 are curved in section, to form the bent portions 11 as shown as FIG. 5.

(c) The throttle ratio (the opening area a2 on the blow-out opening side to the opening area A2 on the suck-in opening side) at the central chamber 8 is set to a suitable value other than "1" according to the size and configuration of the front glass plate G.

(d) The bent portions 11 are eliminated. In this case, the function of paragraph (4) is not obtained; however, because of the action of paragraph (5) the clearing performance can be obtained depending on the size and configuration of the front glass plate G.

(e) The throttle ratio of each of the side chambers 9 is set to a value more than "1". In this case, the action of paragraph (5) is not obtained; however, because of the action of paragraph (4), the clearing performance is sufficiently obtained.

According to the defroster nozzle of the present invention, a defroster can be provided which is improved in clearing performance, and reduced in ventilation resistance and in ventilation noise.

The defroster nozzle according to the present invention is constituted such that the flow rates of air in the chambers from the air conditioning unit are larger towards both end chambers, which causes the air to blow to the end portions of the front glass plate. Hence, the length of the defroster can be reduced in the direction of vehicle width, yet the front glass plate can be cleared uniformly.

Further, the air introduced through the suck-in opening is throttled so that its flow rate is increased in the present invention. Hence, the air is discharged through the blow-out opening at high flow rate.

Still further, as the ratio of the opening area on the side of the suck-in opening to the opening area on the side of the blow-out opening decreases, the flow rate of the air in the chamber is increased. Hence, the air can be discharged towards the end portions of the front glass plate.

What is claimed is:

1. A defroster nozzle provided inside an instrument panel of an automobile and blowing an air to a front glass plate of the automobile, comprising:

a suck-in opening formed at a lower end portion of the defroster nozzle so as to introduce the air;

a blow-out opening formed at an upper end portion of the defroster nozzle so as to blow the air from said suck-in opening to the front glass plate of the automobile; and a plurality of partition boards which divide an inside of the defroster nozzle into a plurality of chambers arranged in a width direction of the automobile, wherein said chambers are so constituted that flow-rates of the air flowing a plurality of chambers increase towards both end chambers from a central chamber.

2. The defroster nozzle according to claim 1, wherein cross-sectional areas of the both end chambers are decreased substantially at a middle in a direction of height so as to increase the flow-rate of the air in the both end chambers.

3. The defroster nozzle according to claim 2, further comprising bent portions provided on outer side walls of the defroster nozzle substantially midway in the height direction and bent in the width direction of the automobile, wherein cross-sectional areas of the end chambers are decreased to increase the flow-rate of air in the end chambers.

4. The defroster nozzle according to claim 2, further comprising bent portions provided on the partition boards substantially midway in the height direction and bent in the width direction of the automobile, wherein cross-sectional areas of the end chambers are decreased to increase the flow-rate of air in the end chambers.

5. The defroster nozzle according to claim 1, further comprising a bent portion provided substantially at a middle in a direction of height and bent in a front-to-rear direction of the automobile so as to change a direction of flowing of the air.

6. The defroster nozzle according to claim 1, wherein the central chamber is expanded in the width direction of the automobile from suck-in opening toward said blow-out opening.

7. The defroster nozzle according to claim 3, wherein each of the end chambers is expanded in the width direction of the automobile from said bent portion toward said blow-out opening.

8. The defroster nozzle according to claim 1, wherein an opening area of the central chamber on a side of said blow-out opening is equal to an opening area of the central chamber on a side of said suck-in opening.

9. The defroster nozzle according to claim 1, wherein an opening area of each of the both end chambers on a side of said blow-out opening is smaller than an opening area of each of the both end chambers on a side of said suck-in opening.

10. A defroster nozzle provided inside an instrument panel of an automobile and blowing an air to a front glass plate of the automobile, comprising:

a suck-in opening formed at a lower end portion of the defroster nozzle so as to introduce the air;

a blow-out opening formed at an upper end portion of the defroster nozzle so as to blow the air from said suck-in opening to the front glass plate of the automobile; and a plurality of partition boards which divide an inside of the defroster nozzle into a plurality of chambers arranged in a width direction of the automobile, wherein said chambers are so constituted that ratios of an opening area on a side of said blow-out opening to an opening area on a side of said suck-in opening decrease towards both end chambers from a central chamber.

11. The defroster nozzle according to claim 10, wherein cross-sectional areas of the both end chambers are decreased substantially at a middle in a direction of height so as to increase of a flow-rate of the air in the both end chambers.

12. The defroster nozzle according to claim 11, further comprising bent portions provided on outer side walls of the defroster nozzle substantially midway in the height direction and bent in the width direction of the automobile, wherein cross-sectional areas of the both end chambers are decreased to increase the flow-rate air in the end chambers.

13. The defroster nozzle according to claim 11, further comprising bent portions provided on the partition boards substantially midway in the height direction and bent in the width direction of the automobile, wherein cross-sectional areas of the end chambers are decreased to increase the flow-rate of air in the end chambers.

14. The defroster nozzle according to claim 10, further comprising a bent portion provided substantially at a middle in a direction of height and bent in a front-to-rear direction of the automobile so as to change a direction of flowing of the air.

15. The defroster nozzle according to claim 10, wherein the control chamber is expanded in the width direction of the automobile from said suck-in opening toward said blow-out opening.

16. The defroster nozzle according to claim 12, wherein each of the end chambers is expanded in the width direction of the automobile from said bent portion toward said blow-out opening.

17. The defroster nozzle according to claim 10, wherein an opening area of the central chamber on a side of said blow-out opening is equal to an opening area of the central chamber on a side of said suck-in opening.

18. The defroster nozzle according to claim 10, wherein an opening area of each of the both end chambers on a side of said blow-out opening is smaller than an opening area of each of the both end chambers on a side of said suck-in opening.

* * * * *